US006963878B2

(12) United States Patent
Anson

(10) Patent No.: US 6,963,878 B2
(45) Date of Patent: Nov. 8, 2005

(54) GENERATING A FOCUSED DATA SET FROM AN ORIGINAL DATA SET

(75) Inventor: David L. A. Anson, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 471 days.

(21) Appl. No.: 09/961,720

(22) Filed: Sep. 24, 2001

(65) Prior Publication Data

US 2003/0061193 A1 Mar. 27, 2003

(51) Int. Cl.$^7$ .................... G06F 17/30; G06F 17/00
(52) U.S. Cl. .................... 707/102; 707/3; 715/500
(58) Field of Search ............... 707/1–10, 100–102, 707/200, 2–4; 715/500, 501.1; 345/204, 418; 382/173, 181

(56) References Cited

U.S. PATENT DOCUMENTS

| | | | | |
|---|---|---|---|---|
| 5,276,616 A | * | 1/1994 | Kuga et al. | 704/10 |
| 5,581,682 A | * | 12/1996 | Anderson et al. | 715/530 |
| 5,634,051 A | * | 5/1997 | Thomson | 707/5 |
| 6,112,212 A | * | 8/2000 | Heitler | 715/501.1 |
| 6,205,456 B1 | * | 3/2001 | Nakao | 715/531 |
| 6,701,350 B1 | * | 3/2004 | Mitchell | 709/217 |

OTHER PUBLICATIONS

Dialog File 410, Acc # 00044457: "KWIC and Hilight: How and When", published May, 1988 (2 pages).*

Arora, T.; Ramakrishna, R.; Roth, W.G.; Seshadri, P.; and Srivastava, D., "*Explaining Program Execution in Deductive Systems*", Third International Conference, DOOD '93. Deductive Object–Oriented Databases, Dec. 6–8, 1993, pp. 101–119.

* cited by examiner

*Primary Examiner*—Frantz Coby
*Assistant Examiner*—Marc R. Filipczyk
(74) *Attorney, Agent, or Firm*—Workman Nydegger

(57) ABSTRACT

Systems and methods for generating a focused data. An original data set contains lines of data that are of interest to a user. The data set is filtered using inclusive filters, exclusive filters, and markers to identify the lines of interest to the user without losing the context of those lines with respect to other lines in the data set. The lines of interest are then displayed in a focused view, where only the lines of interest are displayed to the user, or in a contextual view, where additional lines of data that are related to the lines of interest are also displayed to the user. In the contextual view, the lines of interest are usually highlighted to distinguish them from the lines that provide context. Also, the other lines in the data set are usually not displayed, even though they may be included in the focused data set.

41 Claims, 4 Drawing Sheets

GENERATING A FOCUSED DATA SET FROM AN ORIGINAL DATA SET

BACKGROUND OF THE INVENTION

1. The Field of the Invention

The present invention relates to systems and methods for analyzing data. More particularly, the present invention relates to systems and methods for viewing, searching and navigating large data sets such as textual data, files, or databases and more specifically to producing a focused data set from the original data set.

2. Background and Relevant Art

Computers and computer related technologies such as software are becoming increasingly sophisticated. Computers that used to run at a few Megahertz are now capable of operating at Gigahertz speeds. Computers that offered a few hundred kilobytes of memory now offer hundreds of megabytes of memory. Software development, of course, has adapted to the ever improving technology. Whereas computer programs were often delivered to consumers on a couple of floppy disks that held relatively little data, most computer programs are now delivered on CDROMs that store hundreds of megabytes of data. It is easy to see that the development of software has blossomed from thousands of lines of code to millions of lines of code. One of the side effects of larger programs is that it is potentially more difficult to debug because the programmer is looking at significantly more text.

A similar problem occurs in applications or programs that generate a large amount of output. Data sets such as log files are examples of files that may contain a large amount of text that represent actions that have occurred, for example, in a computer, a network, or a web site. Operating systems generate log files, Internet servers generate log files, and debugging programs generate log files. Other applications may store large amounts of data in other formats, but the same problems apply to these formats as well.

The data sets that are generated in these and other situations can often provide valuable information that can be used in various ways. The problem with these types of data sets is that their size (measured in number of entries, size of a single entry, etc.) makes it difficult to find and view the specific data that is of interest to a user. For example, log files can be used to determine the events that occurred just before a problem crashed a system or terminated an application. Finding and examining the entries corresponding to these events in the log files can then be used to prevent this type of problem for re-occurring. However, the sheer size of the log file makes it very difficult to examine the log file and find the entries or text that is associated with the system crash or with the terminated application. When the appropriate entry (or group of entries) is found in the log file, it may provide some idea as to why the system crashed or why the application terminated improperly. With this information, a user may be able to fix the problem so that this problem does not cause similar actions in the future.

In these types of situations, it is difficult to extract useful information from a data set that has a significant amount of extraneous data because the data of interest is often interspersed among the extraneous data. There are many standard text editors that provide a basic find functionality, but this capability is inadequate when it is necessary to compare two lines of text that are widely separated in the log file or in the data set. Other editors approach this problem by allowing a user to mark certain lines within the data set. While this can be beneficial, it is often not enough to help find the appropriate lines of text. One of the reasons is that these more sophisticated editors are not able to provide context with respect to certain lines of text.

Another potential solution to this problem is to use a global regular expression and print (GREP), which is a function or utility that searches for a certain string of text and outputs any line that contains the specified string. The problem with a GREP is that the output of a GREP cannot be temporally reconciled with the output of other GREPs. The output of one GREP cannot be easily combined with the output of a second GREP because the temporal relationship between the two respective outputs is unknown. In addition, the output of a GREP does not provide the desired context for lines of interest.

SUMMARY OF THE INVENTION

These and other problems are overcome by the present invention which is directed to systems and methods for generating a focused data from an original data set while retaining the context of the focused data set with respect to the original data set. The present invention also relates to systems and methods for viewing, searching, and navigating large data sets such as text files or log files as well as focused data sets.

An original data set is input into an analysis module that processes the original data set by filtering the original data set to identify certain lines of data that satisfy the various filters. The analysis module first filters the data set with inclusive filters to identify lines of the data set that are relevant to the user. The analysis module also permits a user to apply various markers to lines of data in the data set. The lines identified by the inclusive filters and the markers are included in the focused data set such that they can be visually isolated from other lines in the data set.

Next, the analysis module applies exclusive filters to the data set to exclude lines of data in the data set that are not relevant to the user. Thus lines of data identified by the inclusive filters or the markers can be excluded by the exclusive filters. Alternatively, the exclusive filters can be configured to ignore lines of data that were previously identified and included in the focused data set.

Processing the data set with the inclusive filters, markers, and exclusive filters thus generates or produces a focused data set. In the focused data set, the data or lines of data that satisfy all of the requirements specified by the filters and markers are displayed to the user using a display module included in the analysis module. In other words, only the data or lines of data in the data set that are selected or identified by the filters and markers are displayed to the user, with the exception of the lines identified by the exclusive filters. The analysis module provides context by retaining temporal relationships for the output of the filters and markers such that the identified lines of data are displayed as they occurred in the original data set. This ensures that lines of data that satisfy different filters, for example, retain their temporal and other relationships in the focused data set.

The analysis module also provides the ability of providing additional context to the user by displaying additional data to the user that is closely related to the data already included in the focused data set and displayed to the user. The additional data displayed in the contextual view is often located just before and/or after the lines of data that are part of the focused data set. In this manner, a user is able to quickly search and navigate a large original data set to generate a focused data set while retaining the context of the original data set. This permits a user to view certain lines in the data set without having to view the extraneous lines of data in the original data set.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Many applications produce a large amount of data output into data sets (such as files or objects, for example) that are often (but not necessarily) textual in nature. In many situations, there is a need to find certain information that is contained in those types of data sets. With respect to data that is relevant or of interest to a particular user, much of the other data that is in the data set is extraneous. The present invention provides the advantage of being able to generate a focused data set from an original data set such that the user may more efficiently search, navigate, and/or view the relevant data in the original data set. Another advantage is the ability to provide context for the focused data set. The ability to generate or produce a focused data set as described herein enables relevant data to be identified more quickly and efficiently and is useful, for example, when searching for a specific piece of data, discovering a pattern in the original data set that may be expressed over several lines of data or over a single line of data or over lines of data, isolating a particular type of result from the original data set, and the like or any combination thereof.

The present invention extends to both methods and systems for generating a focused data set from an original data set. The present invention also extends to both systems and methods for searching, navigating, and/or viewing a focused data set. The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 1:
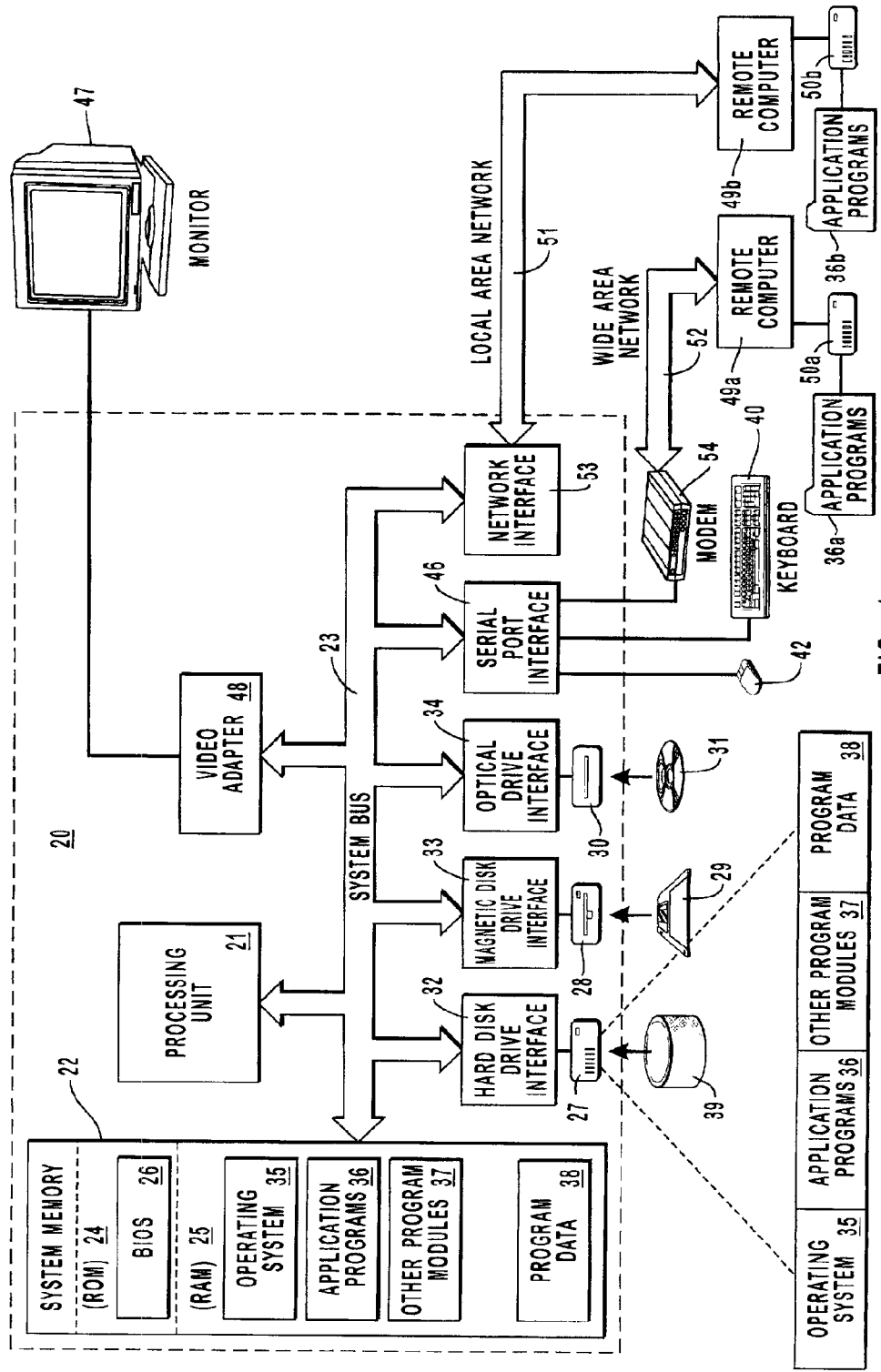
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules and other data for the computer 20. Although the exemplary environment described herein employs a magnetic hard disk 39, a removable magnetic disk 29 and a removable optical disk 31, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 39, magnetic disk 29, optical disk 31, ROM 24 or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49*a* and 49*b*. Remote computers 49*a* and 49*b* may each be another personal computer, a server, a router, a network PC, a peer device or other common network node, and typically include many or all of the elements described above relative to the computer 20, although only memory storage devices 50*a* and 50*b* and their associated application programs 36*a* and 36*b* have been illustrated in FIG. 1. The logical connections depicted in FIG. 1 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

The terms "line(s) of data" are often used with reference to text files that have multiple lines and that are searched or navigated on a line by line basis. As used herein, "line(s) of data" or "lines" refer to portions of a data set or to a portion of content. Further, line(s) of data or lines is not limited to text objects or files but can be applied to the data, content, or portions of data or content of multiple objects and files independently of the format of those objects and files. "Focused lines" or "focused lines of data" usually refers to certain lines of data or portions of content or data that have been identified from an original data set and can either be included or excluded from a focused data set that is generated from the original data set.

Figure 2:
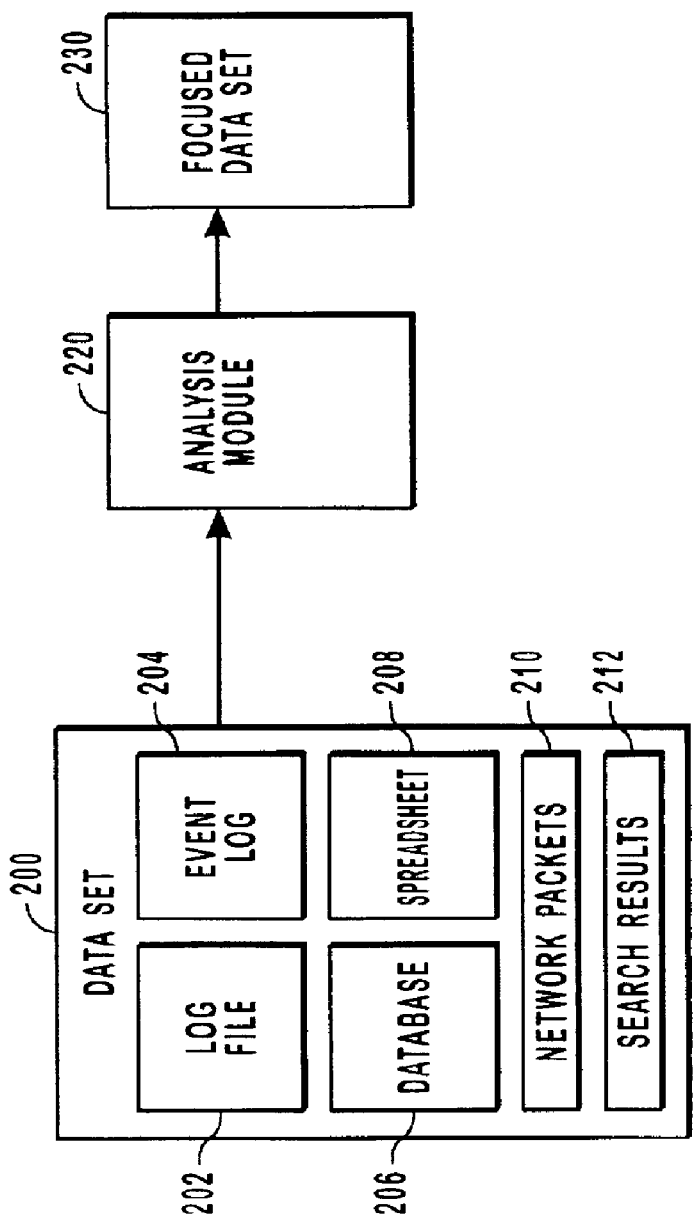
FIG. 2 is a block diagram that illustrates an analysis module that is able to create a focused data set from an existing data set.

FIG. 2 is a block diagram that provides an overview of the present invention, which begins with a data set 200 as shown in FIG. 2. Exemplary data sets include, but are not limited to, log files 202, event logs 204, a database 206, a spreadsheet 208, network packets 210, search results 212, Internet search results, and the like or any combination thereof. The data set 200, regardless of type, is often textual in nature, but this is not a requirement of the present invention because the analysis module 220, as described below, is not limited to focusing textual data.

In one example, the data set 200 is data that a user desires to search or data that contains information of interest to the user. The problem, as previously described, is that the data set 200 may contain a significant amount of information that is extraneous with respect to the information that is relevant to the user and that the user is attempting to find. In many instances, each data set 200 can be represented as text (a cookie or an encrypted file, for instance) even though the text may not be human understandable.

The present invention provides systems and methods for viewing, searching, and/or navigating the data set 200 using an analysis module 220. The analysis module 220 begins by processing the data set 200 to produce or generate a focused data set 230 and this process can be performed iteratively. For example, the focused data set 230 can become a new data set from which a new focused data set is generated. Alternatively, the same data set 200 can be repeatedly processed by the analysis module 220 to generate one or more focused data sets. In other words, the existing focused data set 230 can be altered as parameters of the analysis module 220 are changed or the output of the analysis module 220 can be directed to different focused data sets as the parameters or filters are changed. The focused data set 230 provides a user with data that is of interest to the user and excludes extraneous data. The focused data set 230 is, in effect, a searched version of the original data set 200.

Figure 3:
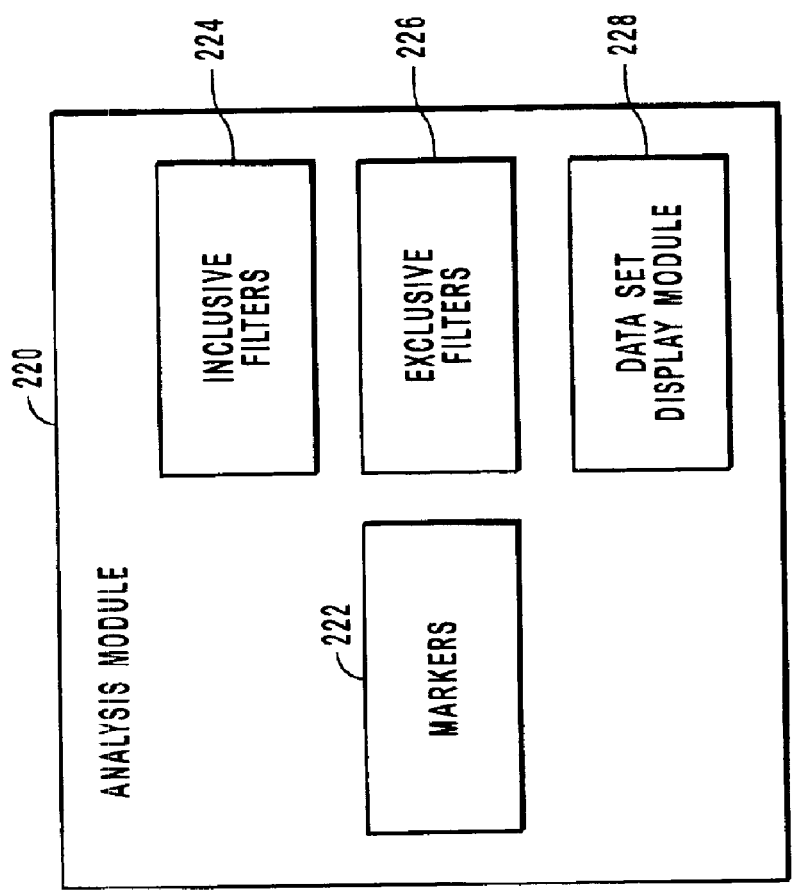
FIG. 3 is a block diagram that more fully illustrates the analysis module.

FIG. 3 is a block diagram used to more fully describe the parameters of the analysis module 220 and how the data set is processed to produce a focused data set. As previously mentioned, one advantage of the analysis module 220 is that the focused data set can provide a user with context of their search rather than simply producing search results.

The analysis module 220 includes, but is not limited to, inclusive filters 224, exclusive filters 226, markers 222, and a display module 228. The data set described with reference to FIG. 2 is an input into the analysis module 220 and the inclusive filters 224, exclusive filters 226, and markers 222 can be viewed as parameters that can be changed by the user. As used herein "filters" refers generally to inclusive filters, exclusive filters and markers. Each filter is intended to identify one or more lines that are related to the lines that are relevant to the user. The user is able to configure the filters as the user searches the original data set for particular lines. For example, a text filter can employ wildcards, regular expressions, and other features commonly used in text searches.

The inclusive filters 224 are used to search for certain data or identify certain lines of data or text in the data set that is relevant to the user. A user can establish any number of inclusive filters 224 to execute or apply against the data set. For example, log files usually store a record of computer activity such as text dialog, error and status messages, transaction details, and the like. Because this information is often entered as lines of text, the inclusive filters 224 can operate to find certain text portions on various lines. All lines that satisfy one or more of the inclusive filters will be identified and included in the focused data set. In one specific example, all lines that satisfy the inclusive filters 224 are highlighted and the remaining lines of the data set 200 are darkened such that they are not displayed.

The exclusive filters 226 are also used to search for certain data in the data set that is to be excluded from the focused data set 230 and a user can establish any number of exclusive filters to execute against the data set. Because a primary difference between the inclusive filters 224 and the exclusive filters 226 is that data or text lines identified by the exclusive filters 226 are not included in the focused data set, the exclusive filters 226 are usually executed after the inclusive filters 224. In one instance, the lines of data excluded by the exclusive filters 226 are not actually removed from the data set, rather these lines of data are simply not displayed to the user. This helps maintain the context and relationships, such as temporal relationships, that may exist between lines of data that are identified by the filters and included in the focused data set.

The analysis module 220 also includes markers 222, which are a type of filter. The present invention allows for multiple types of markers such that certain portions of the original data set or certain text lines are either displayed or hidden from the viewer according to the marker and regardless of whether they satisfy any of the inclusive or exclusive filters. Thus, marked lines may or may not be displayed to the user.

The lines of a data set that do not satisfy the inclusive filters are not removed from the data set. However, those lines that do not satisfy the inclusive filters are not displayed to a user because they are extraneous. Alternatively, the lines that do not satisfy the inclusive filters may be removed from the focused data set. The advantage of not removing the lines that do not satisfy the inclusive filters is that a user is able to change the inclusive filters and thus alter the focused data set. In this example, different lines would be displayed to a user and some of the lines that were displayed will no longer be displayed to the user. The relationships of the displayed lines is retained and as described below, the context of the displayed lines can also be easily displayed to the user.

Thus, including focused lines in the focused data set provides a way to visually isolate the focused lines from the extraneous lines in the data set. In other words, the content of the focused data set is substantially the same as the content of the original data set, except that some of the lines are visually isolated from other lines. In one example, lines that satisfy the filters and the markers are highlighted and the other lines are darkened such that the user only views the highlighted or focused lines. Also, the context of the focused lines is not lost because the extraneous lines are not really removed from the data set, they are simply less visible to the user. Thus, including lines in the focused data set indicates that the included lines will be highlighted or otherwise distinguished from the other lines in the original data set.

A similar action occurs with the exclusive filters and the markers. Lines that meet the requirements of the exclusive filters are not displayed in the focused data set. Lines that are marked are either displayed or not displayed according to the marker type. To display the focused data set, the display module 228 simply highlights or otherwise distinguishes those lines that satisfy the filters and markers while darkening or otherwise indistinguishing those lines that do not meet the requirements of the filters and markers.

Figure 4B:
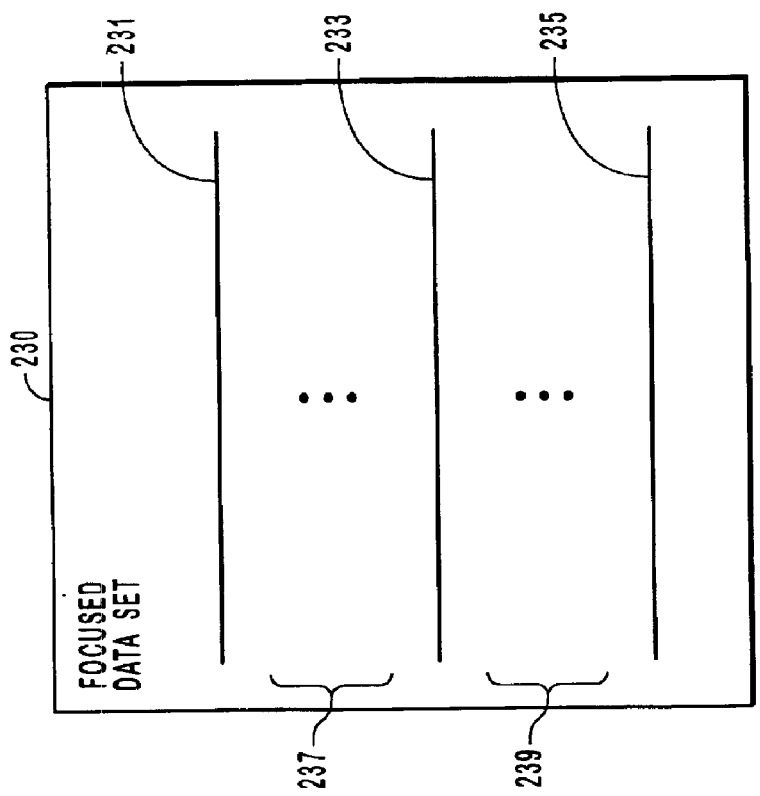
FIG. 4B is a block diagram that illustrates a focused data set being displayed without the context of other data in the original data set.
Figure 4A:
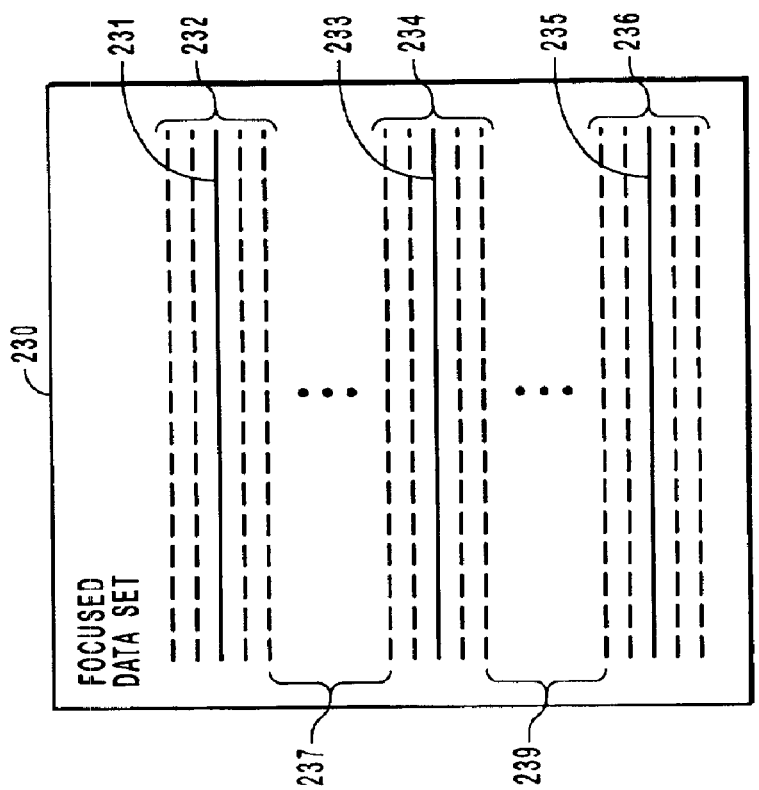
FIG. 4A is a block diagram that illustrates a focused data set being displayed in context of surrounding or related data in the original data set.

FIGS. 4A and 4B more fully illustrate how a focused data set is displayed to a user and FIGS. 4A and 4B illustrate a contextual view of the focused data set and a normal view of the focused data set respectively. More generally, FIGS. 4A and 4B illustrate how the lines of data identified by the filters can be visually isolated from other line of data in the original data set. FIG. 4A is a contextual view of the focused data set 230 and displays related lines from the original data set. Thus contextual lines that are related (temporally, textually, etc.) to lines or data that satisfy the filters or parameters of the analysis module are displayed along with those lines that meet the requirements of the filters and markers. For example, in FIG. 4A, focused lines 231, 233, and 235 are lines that are displayed to the user because they satisfy an inclusive filter, an exclusive filter or are marked.

The dashed lines represent lines of data that are contextually related to the focused lines. When the focused data set 230 is displayed in context, the related lines are also displayed. In this example, the related lines are not displayed as brightly as the focused lines such that the user can distinguish between those lines that satisfy the filters and markers and those lines that provide context. Related or context lines can be provided before and/or after the focused lines of the focused data set.

In the example of FIG. 4A, the space 237 and the space 239 represents portions of the data set that are not displayed to the user (extraneous lines of data). The separation indicates that the focused line 231 and the focused line 233 are separated. Their relationship, however, can be determined by causing the non-relevant lines to be displayed. When the non-relevant lines are displayed, however, the user may be looking at a portion of the original data set with the difference that the focused lines are still highlighted or otherwise distinguished. Note that the focused data set does not need to be displayed with a separation as illustrated in the FIG. 4A. The relationship of the lines displayed in the focused data set 230 provides relationships between the individual lines, because they are displayed as they occur in the original data set except that the extraneous lines are not displayed.

FIG. 4B illustrates a focused data set 230 where only the focused data lines 231, 233, and 235 are displayed. The space 237 and 239 again represent non-relevant or extraneous lines of data with respect to the filters and markers of the analysis module. Again, the focused lines can be displayed without a separation between each individual line of data.

FIG. 4B also illustrates another advantage of the present invention by showing relationships between the focused lines as previously described. For example, many of the data sets that are processed by the analysis module occur or are created over time. Thus, the lines in the data set have a temporal relationship, meaning that the first lines of the data set occurred before later lines of the data set. When the user applies a filter, the lines that meet that filter are displayed to the user. When a second filter is applied to the data set, those lines are also displayed to the user along with the lines that satisfy the first filter. By displaying these lines simultaneously, the user is able to view the temporal relationship between the lines because they are displayed in the order they occurred in the original data set. This reasoning can be expanded to include all of the filters and markers such that the focused data set 230 can provide the user with the temporal relationships of the displayed focused lines. Related lines or lines that provided context can be either displayed or turned off, for example, using a command. This enables the user to quickly switch between a normal or focused view and a contextual view of the focused data set. In other words, the focused data set can be viewed as illustrated in FIG. 4A or the user can toggle to the focused data set illustrated in FIG. 4B. The focused data set can also be quickly navigated by proceeding from focused line to focused line.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system that includes a data set that includes lines that have information that is relevant to a user and wherein the lines are dispersed among a plurality of extraneous lines in the data set, a method for processing the data set to identify and display the lines to the user without losing a context of the lines with respect to other lines in the data set, the method comprising:
   a step for providing a plurality of filters at an analysis module, wherein the filters include at least one inclusive filter and at least one exclusive filter;
   a step for processing the data set through the filters to create a focused data set that satisfies the filters;
   a step for generating the focused data set by (a) applying the at least one inclusive filter to the data set to identify focused lines of data that comprise the focused data set, and (b) after applying the at least one inclusive filter, applying at least one exclusive filter to the data set to identify data that is to be excluded from being displayed with the focused data set and without removing the data identified by the at least one exclusive filter from the data set, such that the exclusive filter identifies lines of the data set that are to be excluded from the focused data set in such a way that the exclusive filter further focuses data to be displayed in the focused data set; and
   a step for displaying the focused data set to the user by visually isolating the focused lines included in the focused data set, and wherein lines that are excluded by the at least one exclusive filter from being displayed to the user with the focused data set are indistinguished from the focused data set in such a way that they are effectively excluded from being displayed without being removed from the data set.

2. A method as defined in claim 1, wherein the step for displaying the focused data set includes visually isolating the lines included in the focused data set while displaying related lines that provide context for the lines included in the focused data set.

3. A method as defined in claim 2, wherein the step for displaying the focused data set to the user further comprises a step for toggling between a first view of the focused data set and a second view of the focused data set, wherein the first view only displays lines that are included in the focused data set and wherein the second view displays both the focused data set and the related lines that provide context.

4. A method as defined in claim 1, wherein the step for displaying the focused data set to the user further comprises a step of distinguishing the lines included in the focused data set by highlighting the included lines, and wherein the lines that are not included in the focused data set are darkened.

5. A method as defined in claim 1, wherein the act of providing the one or more filters further comprises an act of configuring the one or more filters to identify text.

6. A method as defined in claim 1, wherein the step for generating the focused data set includes highlighting the focused lines of data.

7. A method as defined in claim 1, wherein the step for visually isolating the focused lines includes indistinguishing the lines of data identified by each exclusive filter by darkening the lines of data identified by each exclusive filter.

8. A method as defined in claim 1, wherein the step for displaying the focused data set further comprises an act of providing a contextual view of the focused data set by displaying additional lines of data that are related to the focused lines of data with the focused lines of data.

9. A method as defined in claim 8, wherein the additional lines of data are related to the focused lines of data according to a temporal order in which the additional lines and focused lines occurred in the data set.

10. A method as defined in claim 8, wherein the step for displaying the focused data set further comprises toggling between the contextual view of the focused view of the focused data set and a focused view of the focused data set where only the focused lines of data are displayed.

11. A method as defined in claim 10, further comprising:
    creating a normal view of the focused data set in which all lines of the data set are displayed, wherein the focused lines of data are still distinguished from other lines in the data set, and
    providing means for toggling between the normal view, the focused view and the contextual view, each view having been created with said set of filters.

12. A method as defined in claim 1, further comprising an act of navigating from a first focused line of data to a second focused line of data.

13. A method as recited in claim 1, wherein the data set comprises one of a log file and an event file.

14. A method as recited in claim 1, wherein at least one line identified by an inclusive filter is also identified by an exclusive filter.

15. In a system that includes a data set that includes particular lines that have information that is relevant to a user and wherein the particular lines are dispersed among a plurality of extraneous lines in the data set, a computer program product for implementing a method for processing the data set to identify and display the particular lines to the user without losing a context of the particular lines with respect to other lines in the data set, the computer program product comprising:
   a computer readable medium having computer readable instructions for performing the method recited in claim 1.

16. A computer program product as defined in claim 15, wherein the step for displaying the focused data set includes visually isolating the lines included in the focused data set while displaying related lines that provide context for the lines included in the focused data set.

17. A computer program product as defined in claim 16, wherein the step for displaying the focused data set to the user further comprises a step for toggling between a first view of the focused data set and a second view of the focused data set, wherein the first view only displays lines that are included in the focused data set and wherein the second view displays both the focused data set and the related lines that provide context.

18. A computer program product as defined in claim 15, wherein the step for displaying the focused data set to the user further comprises a step of distinguishing the lines included in the focoused data set by highlighting the included lines, and wherein the lines that are not included in the focused data set are darkened.

19. A computer program product as defined in claim 15, wherein the act of providing the one or more filters further comprises an act of configuring the one or more filters to identify text.

20. A computer program product as defined in claim 15, wherein the step for generating the focused data set includes highlighting the focused lines of data.

21. A computer program product as defined in claim 15, wherein the step for visually isolating the focused lines includes indistinguishing the lines of data identified by each exclusive filter by darkening the lines of data identified by each exclusive filter.

22. A computer program product as defined in claim 15, wherein the step for displaying the focused data set further comprises an act of providing a contextual view of the focused data set by displaying additional lines of data that are related to the focused lines of data with the focused lines of data.

23. A computer program product as defined in claim 22, wherein the additional lines of data are related to the focused lines of data according to a temporal order in which the additional lines and focused lines occurred in the data set.

24. A computer program product as defined in claim 22, wherein the step for displaying the focused data set further comprises toggling between the contextual view of the focused view of the focused data set and a focused view of the focused data set where only the focused lines of data are displayed.

25. A computer program product as defined in claim 24, the method further comprising:
creating a normal view of the focused data set in which all lines of the data set are displayed, wherein the focused lines of data are still distinguished from other lines in the data set, and
providing means for toggling between the normal view, the focused view and the contextual view, each view having been created with said set of filters.

26. A computer program product as recited in claim 15, wherein the data set comprises one of a log file and an event file.

27. A computer program product as defined in claim 15, the method further comprising an act of navigating from a first focused line of data to a second focused line of data.

28. In a system including application that generate data sets that contain lines of data that are of interest to a user, and wherein the user does not know where the lines of data are located in the data set, a method of displaying lines of data that are of interest to the user while retaining a context of the lines of data with respect to the data set even though the lines of data are interspersed in the data set among other extraneous lines of data, the method comprising:
receiving a data set into an analysis module, wherein the analysis module having filters including one or more inclusive filters, one or more markers, and one or more exclusive filters, wherein the filters are configured to identify the lines of data of interest to the user;
filtering the data set with the filters, wherein the lines of data identified by those filters that are inclusive filters or markers are included in a focused data set and wherein the lines of data identified by those filters that are exclusive filters are excluded from the focused data set;
creating multiple different filtered views of the focused data set, with a same set of filters, the multiple different filtered views including a focused view and a contextual view, wherein the focused view only includes lines of data that are identified by those filters that are inclusive filters and markers, and wherein the contextual view displays additional lines of data that are related to the lines of data that are included in the focused data set;
displaying the focused data set in either the focused view or the contextual view while providing the user with the ability to toggle between the focused view and the contextual view.

29. A method as defined in claim 28, wherein the step for receiving a data set further comprises one or more of:
receiving a log file into the analysis module;
receiving an event log into the analysis module;
receiving a database into the analysis module;
receiving a spreadsheet into the analysis module;
receiving network packets into the analysis module; and
receiving search results into the analysis module.

30. A method as defined in claim 28, wherein the step for filtering the data set with the filters further comprises an act of filtering the data set with inclusive filters and markers before filtering the data set with exclusive filters.

31. A method as defined in claim 28, further comprising an act of distinguishing the focused lines of data in the contextual view from the related lines of data by one of highlighting the focused lines of data and darkening the related lines.

32. A method as recited in claim 28, wherein the data set comprises one of a log file and an event file.

33. A method as recited in claim 28, wherein the focused view separates the lines that were not originally displayed next to each other in the data set by extra spacing to reflect a corresponding temporal relationship that existed between the lines in the data set before the data set was filtered.

34. A method as recited in claim 28, wherein the multiple different filtered views includes a normal view in which all lines of the data set are displayed, with the lines of the focused data set being distinguished from lines of the data set that are not part of the focused data set.

35. A method as recited in claim 28, wherein the related lines are textually related to the lines of data in the focused data set.

36. In a system including applications that generate data sets that contain lines of data that are of interest to a user, and wherein the user does not know where the lines of data are located in the data set, a computer program product for implementing a method of displaying lines of data that are of interest to the user while retaining a context of the lines of data with respect to the data set even though the lines of data are interspersed in the data set among other extraneous lines of data, the computer program product comprising:

a computer readable medium having computer readable instructions for performing the method of claim 31.

37. A computer program product as defined in claim 36, wherein the step for receiving a data set further comprises one or more of:

receiving a log file into the analysis module;

receiving an event log into the analysis module;

receiving a database into the analysis module;

receiving a spreadsheet into the analysis module;

receiving network packets into the analysis module; and receiving search results into the analysis module.

38. A computer program product as defined in claim 37, the method further comprising an act of distinguishing the focused lines of data in the contextual view from the related lines of data by one of highlighting the focused lines of data and darkening the related lines.

39. A computer program product as defined in claim 36, wherein the step for filtering the data set with the filters further comprises an act of filtering the data set with inclusive filters and markers before filtering the data set with exclusive filters.

40. A computer program product as recited in claim 36, wherein the data set comprises one of a log file and an event file.

41. A computer program product as recited in claim 36, wherein the multiple different filtered views includes a normal view in which all lines of the data set are displayed, with the lines of the focused data set being distinguished from lines of the data set that are not part of the focused data set.

* * * * *

UNITED STATES PATENT AND TRADEMARK OFFICE
CERTIFICATE OF CORRECTION

PATENT NO. : 6,963,878 B2  Page 1 of 1
APPLICATION NO. : 09/961720
DATED : November 8, 2005
INVENTOR(S) : David L. A. Anson It is certified that error appears in the above-identified patent and that said Letters Patent is hereby corrected as shown below:

Title Page, Item (56), under "Other Publications" in column 2, line 1, delete "Hilight" and insert -- Highlight --, therefor.

In column 9, line 49, in Claim 1, after "applying" insert -- the --, therefor.

In column 11, line 17, in Claim 18, delete "focoused" and insert -- focused --, therefor.

In column 11, line 63, in Claim 28, delete "application" and insert -- applications --, therefor.

In column 13, line 5, in Claim 36, delete "claim 31" and insert -- claim 28 --, therefor.

Signed and Sealed this

Twenty-eighth Day of July, 2009

JOHN DOLL
*Acting Director of the United States Patent and Trademark Office*